United States Patent
Witteborg et al.

(10) Patent No.: US 9,542,178 B2
(45) Date of Patent: Jan. 10, 2017

(54) IN-PLACE DEFINITION OF SOFTWARE EXTENSIONS

(71) Applicants: Heiko Witteborg, Griesheim (DE); Anis Charfi, Darmstadt (DE); Taid Holmes, Maintal (DE)

(72) Inventors: Heiko Witteborg, Griesheim (DE); Anis Charfi, Darmstadt (DE); Taid Holmes, Maintal (DE)

(73) Assignee: SAP SE, Walldorf (DE)

( * ) Notice: Subject to any disclaimer, the term of this patent is extended or adjusted under 35 U.S.C. 154(b) by 633 days.

(21) Appl. No.: 13/673,075

(22) Filed: Nov. 9, 2012

(65) Prior Publication Data

US 2014/0137079 A1 May 15, 2014

(51) Int. Cl.
*G06F 9/44* (2006.01)
(52) U.S. Cl.
CPC .................................... *G06F 8/71* (2013.01)
(58) Field of Classification Search
CPC ................. G06F 8/72; G06F 8/73; G06F 8/71
USPC .................................. 717/100–105, 120–123
See application file for complete search history.

(56) References Cited

U.S. PATENT DOCUMENTS 7,844,978 B2 * 11/2010 Tsuji et al. ..................... 719/331
8,627,270 B2 * 1/2014 Fox et al. ..................... 717/100

OTHER PUBLICATIONS

Sonatype, Inc., "Maven: The Complete Reference", 2011, retrieved from http://books.sonatype.com/mvnref-book/pdf/mvnref-pdf.pdf, pp. i-xxiii, 1-317.*
Balko et al., "Controlled Flexibility and Lifecycle Management of Business Processes through Extensibility", 2009, In EMISA 2009, retrieved from QUT Digital Repository, 15 pages.*
Witteborg et al., Method and System for In-Place Modeling of Business Process Extensions as First-Class Entities, SAP Research Darmstadt, ICSOC 2012, LNCS 7759, Springer 2013, 4 pages.
Witteborg et al., Business Process Extensions as First-Class Entities—A Model-Driven and Aspect-Oriented Approach, In: ICSOC. Lecture Notes in Computer Science, Springer 2012, 8 pages.

* cited by examiner

*Primary Examiner* — Ted T Vo
(74) *Attorney, Agent, or Firm* — Fish & Richardson P.C.

(57) ABSTRACT

Implementations of the present disclosure include methods, systems, and computer-readable storage mediums for providing in-place extensions to an application, including receiving one or more artifacts associated with the application; graphically depicting a representation of at least one artifact of the one or more artifacts on a display, the at least one artifact comprising extension points defined by a developer of the application; receiving first user input indicating a first extension to the at least one artifact, the first extension being associated with an extension point of the one or more extension points and being applied to the representation, the at least one artifact remaining unchanged in view of the first extension being applied to the representation; determining a delta based on the first extension and the at least one artifact; and storing the delta in an extension repository, the delta being usable to extend one or more other artifacts.

16 Claims, 8 Drawing Sheets

IN-PLACE DEFINITION OF SOFTWARE EXTENSIONS

BACKGROUND

Extensibility is a topic of increasing importance in the software industry. In some examples, software applications are delivered by a software provider to support a certain domain through a set of predefined functionalities. Customers that acquire software applications can require additional functionalities that are not supported by the base software. In some examples, these additional functionalities can be realized through extensions. In some examples, extensions can be defined and/or developed by different roles. For example, extensions can be provided by the provider of the base software (the vendor), by the customer, and/or by a third party (e.g., an independent software vendor (ISV)). In some examples, to enable extensions, the provider of the base software defines extensibility concepts and mechanisms for the base software and provides supporting tools.

SUMMARY

Implementations of the present disclosure include computer-implemented methods for providing one or more in-place extensions to an application, including receiving, by the one or more processors, one or more artifacts associated with the application, the application comprising a computer-executable program; graphically depicting, by the one or more processors, a representation of at least one artifact of the one or more artifacts on a display, the at least one artifact comprising one or more extension points defined by a developer of the application; receiving, by the one or more processors, first user input indicating a first extension to the at least one artifact, the first extension being associated with an extension point of the one or more extension points and being applied to the representation, the at least one artifact remaining unchanged in view of the first extension being applied to the representation; determining, by the one or more processors, a delta based on the first extension and the at least one artifact; and storing, by the one or more processors, the delta in an extension repository, the delta being usable to extend one or more other artifacts.

These and other implementations may each optionally include one or more of the following features. For instance, an extended artifact is defined based on application of the first extension to the representation. The delta is determined as a difference between the extended artifact and the at least one artifact. Receiving second user input indicating a second extension to the at least one artifact; determining that the second extension is a prohibited extension; and prohibiting application of the second extension. The prohibited extension is defined by the developer of the application. The prohibited extension comprises a deletion of a portion of the artifact. Graphically displaying a list of applications on a display; and receiving user input indicating a selection of the application from the list of applications, wherein graphically depicting the representation of the at least one artifact on the display is performed in response to the user input. Graphically displaying a list of available extensions on a display; and receiving user input indicating a selection of the first extension from the list of available extensions. The representation of the at least one artifact comprises a process level representation depicting one or more tasks and a workflow provided as edges between tasks of the one or more tasks. The first extension comprises one of a modification of a task of the one or more tasks, a deletion of a task from the one or more tasks and an addition of a task to the one or more tasks. The first user input comprises a graphical manipulation of the representation. The representation of the at least one artifact comprises a code level representation. The representation of the at least one artifact comprises an interface level representation. For each extension point of the one or more extension points, providing a list of available extensions, the list of available extensions being specific to a respective extension point.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
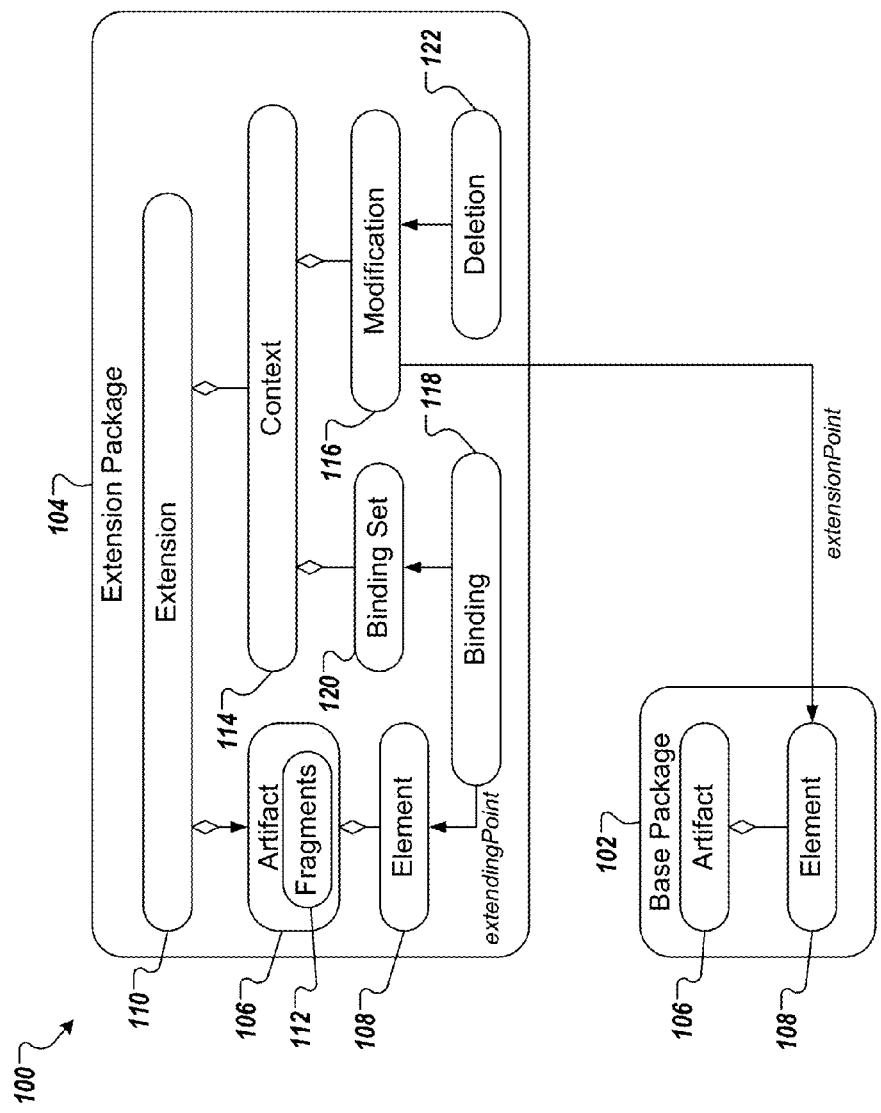
FIG. 1 depicts a generic extension meta-model in accordance with implementations of the present disclosure.

Implementations of the present disclosure are generally directed to defining software extensions on a logical layer of a software application (e.g., a business process layer, a user interface layer, a code layer). In some examples, artifacts (e.g., source code, models), or views on artifacts of the software application are provided to a software extender (e.g., a customer, a third-party vendor). In some examples, the software extender extends the application based on the provided artifacts. In some implementations, tools, such as graphical editors are provided, which the software extender can use to extend the application. In some examples, the tools ensure that only extensions allowed by the software providers are permitted. In some examples, the tools provide the impression that the software extender is directly modifying the artifacts, while the artifacts actually remain unaffected. In some examples, in response to an extension, a delta is provided and represents the extension. In some examples, the delta is stored in an extension module and the original artifact of the application remains unmodified. In some examples, deltas can be reused to extend other applications.

In some implementations, base software artifacts can be provided. In some examples, the artifacts are provided by the software provider (e.g., the developer). In some examples, an artifact can be provided as an internal development artifact. In some examples, an artifact can be provided as a view on an artifact, which may hide certain aspects of the underlying artifact. In some examples, a view on an artifact can expose internal applications without hiding any aspects. In some examples, explicit extension points can be defined (e.g., by the software provider) in the provided artifacts.

In some implementations, in-place extension definition inside an artifact (or a view of an artifact) is provided. In some examples, the software developer can define the in-place extensions of an artifact. In some examples, the in-place extension definition can be implemented utilizing appropriate tools (e.g., special model editors or text editors). In some examples, the tools ensure that only extensions that are allowed (e.g., as determined by the software provider) can be performed.

In some implementations, the extension (modification) can be extracted to a separate module (e.g., an extension module). In this manner, the extensions are reusable and the artifacts and views (as provided by the base software provider) are unchanged. In some examples, extensions of artifacts and the underlying artifacts are separated. In this manner, the artifacts and views provided by the base software provider are not changed by the extender.

In some implementations, one or more extensions can be composed using artifacts of the application. In some examples, after extracting extensions in separate modules, the modules can be recomposed with artifacts to provide extended versions of artifacts. In some examples, implementations of the present disclosure support composition and decomposition of extensions with artifacts.

In some implementations, one or more graphical editors are provided. In some examples, graphical depictions of one or more artifacts of the application are provided (e.g., to an extension developer). The graphical depictions of the artifacts can be on differing logical layers. The graphical depictions of the one or more artifacts facilitate the extension developer determining the feasibility of developing an extension for the application and estimating the change impact of developing the extension. Additionally, by providing such graphical depictions of the artifacts, the extension developer is provided an impression of directly modifying the artifacts (e.g., the models of the source code). In some examples, a special editor is provided that extracts the extension defined by the extension developer in a separate extension module, such that the base software views and the extensions are stored separately.

FIG. 1 illustrates a meta-model, specifically, an extension meta-model 100 of a software application (e.g., a business application). In some implementations, the meta-model 100 models modular and reusable extensions (e.g., process extensions) as first class entities. The meta-model 100 includes a base package 102 and an extension package 104.

The base package 102 includes a meta-model of a base language (i.e., a computer programming language associated with artifacts that an extension developer is extending). The base language can be any computer programming language that includes artifacts and elements of the artifacts.

In some examples, the base package 102 includes one or more artifacts 106. In some examples, an artifact 106 can be provided as a container concept of the base language (e.g., a class or script of a computer programming language; or a model of a modeling language), and can be modified (e.g., extended) by an extension developer. In some examples, the artifact 106 is a base artifact, which is provided as an unmodified artifact of the application. For example, the base artifact can be provided by a software developer of the application. In some examples, the artifact 106 is a target artifact, which is provided as a previously extended base artifact. For example, the target artifact can be provided as a base artifact that has been previously extended one or more times. In some examples, the artifact 106 is an extended artifact that is provided as a target artifact that has been modified as defined by an extension.

In some examples, the artifact 106 includes one or more elements 108. In some examples, the elements 108 include expressions, methods, or statements of the computer programming language; or vertices and edges of a graph-based modeling language. In some examples, each element 108 is uniquely identifiable. In accordance with implementations of the present disclosure, the element 108 can be selected (e.g., by the extension developer) as an extension point (e.g., the target of the modification). In some examples, selection of the element 108 as an extension point can be restricted (e.g., by the software developer) on the meta-level, the instance-level, or both. In some examples, restrictions of the selection of the element 108 as the extension point on the meta-level can include restrictions to an appropriate subset of elements of the base language (e.g., non-control flow statements in the computer programming language; vertices, and not edges in the graph-based modeling language). In some examples, restrictions of the selection of the element 108 as the extension point on the instance-level can include restrictions of one or more portions of the application, or restrictions on modification options to the one or more portions of the application. In this manner, the modification of an application's base logic is prevented and remains consistent (e.g., by excluding that certain methods/method calls can be replaced).

In accordance with implementations of the present disclosure, the extension package 104 defines concepts that can be included in an extension. In the depicted example, the extension package 104 includes an extension 110, one or more extension fragments 112, one or more context objects 114, one or more modification objects 116, and one or more binding set objects 120, and a deletion object 122. Additionally, the extension package 104 includes the artifact 106 and the one or more elements 108 from the base package 102 as the extension package 104 is an extension of the base package 102. In the depicted example, a binding object 118 is provided for each element 108 and each binding set 120, and a modification captured in a modification object 116 is applied to one element 108 of the base package 102.

In some implementations, the extension 110 includes elements and target artifact modifications that are associated with a category of the extension 110. In some examples, the logic implementing the target artifact modifications can be aggregated in the extension 110 and stored modularly as a first-class entity. In some examples, the extension 110 can target multiple target artifacts. For example, the extension 110 can target multiple target artifacts to provide associated modification across artifact borders (e.g., adapting an interface and implementing classes in targeting an object-oriented programming language). In some examples, the extension 110 can target multiple target artifacts to enable the re-use of previously existing and defined extension fragments (e.g., extension fragments 112) in a differing context (e.g., re-using an extension for process monitoring in the context of business processes).

In some examples, the extension 110 can target a previously extended base artifact (e.g., a target artifact), resulting in a hierarchy of extension dependencies. In this manner, the extension 110 can also aggregate modifications targeting the base artifact and modifications targeting the extension fragments of other extensions (e.g., an active extension).

In some implementations, the extension fragments 112 include introduced elements (e.g., by the extension developer). In some examples, the extension fragments 112 use the same constructs as the base language, following a symmetric approach to composition (that is, there is no conceptual distinction between the base language and the extension language). As a result, extended target artifacts conform to the base language, thus facilitating the definition of the extensions, and support the extension of the extensions. The extension fragments 112 are captured in (not necessarily syntactically complete) artifacts (e.g., by artifact 106). In some examples, each extension fragment 112 includes a set of directly associated, newly introduced elements. In some examples, the elements are added to a base artifact (e.g., artifact 106) at several distinct extension points (e.g., element 108), or are added to multiple base artifacts. In this manner, an extension can contain multiple extension fragments 112.

In some implementations, the context object 114 can optionally be defined to group the modifications that belong to the same application area of the category of the extension 110. In some examples, the context object 114 can group modifications targeting different artifacts that serve the same purpose. For example, an extension (e.g., extension 110) providing additional customer data can be applied (a) in the context of targeted marketing campaign management and (b) in the context of price calculation and payment term selection. In some implementations, when a toolset does not support the differentiation of different application contexts via the context concept, all modifications are contained in a default context.

In some implementations, the modification object 116 describes a single extension operation that is performed on a certain extension point (e.g., element 108). The extension point is an element (e.g., element 108) contained in the target artifact (e.g., artifact 106). In some examples, the modification object 116 can include different types as modifications, modeled as subtypes of the modification object 116. In some examples, the types of modifications can include the binding object 118 and the deletion object 122. In some examples, the binding object 118 is grouped in the binding set object 120.

In some examples, the binding object 118 connects an element contained in one of the extension's fragments 112 with an extension point (e.g., element 108) contained in the target artifact (e.g., artifact 106). The extension point and extending point reference single identifiable elements of the underlying language. For example, the "pointsTowardExtension" attribute of the binding object 118 specifies the direction of the binding object 118. In some examples, the semantics of the binding object 118 is language-specific. For example, when targeting a graph-based modeling language, the binding object 118 can be defined as a directed edge between the extended vertex and the extending vertex. In this case, the "pointsTowardExtension" attribute specifies the direction of the newly introduced edge. When targeting a programming language, the binding object 118 can define an insertion into the sequence of statements, with the "pointsTowardExtension" attribute specifying whether the additional statements should be added before or after the extension point (e.g., element 108).

In some examples, the binding set object 120 is a group of copy-specific binding objects 118. In some examples, the extension fragments 112 may be added to a certain target artifact (e.g., artifact 106) multiple times. Each of the extension fragment 112 (e.g., each copy of the extension fragment 112) can have multiple binding objects 118. For example, when targeting a graph-based language, two binding objects 118 are defined per extension process fragment: the first binding object 118 is used to divert the flow of the target process towards the extension fragment 112 and the second binding object 118 is used to merge the two branches again. In some examples, the binding set object 120 is used to group these copy-specific bindings.

In some examples, the deletion object 122 provides for the deletion of the target artifact element (e.g., element 108) selected as the extension point. When targeting a graph-based modeling language, the deletion of a vertex can result in interconnecting the incoming and outgoing edges of the deleted element. When targeting a programming language, the deletion can result in hiding the selected statement from the sequence of statements.

Figure 2:
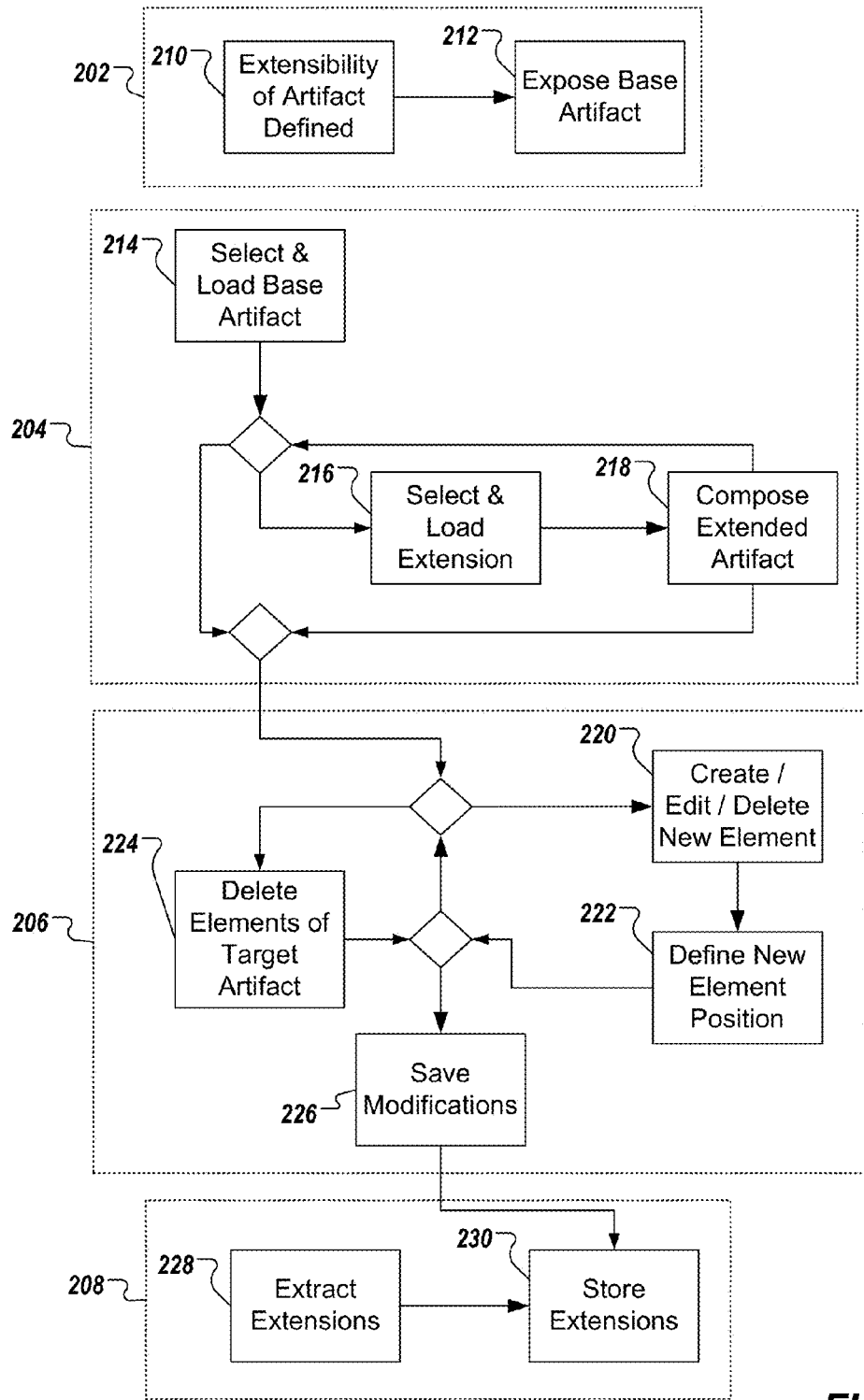
FIG. 2 depicts an example development process for in-place extensions in accordance with implementations of the present disclosure.

FIG. 2 depicts an example development process 200 for in-place definition of extensions based on the meta-model 100. The example process 200 includes four phases of the development process: phase 1 (202) includes definition of extensibility views and base artifacts; phase 2 (204) includes target artifact selection; phase 3 (206) includes in-place extension definition; and phase 4 (208) includes extraction and storage of the extensions.

In accordance with implementations of the present disclosure, during phase 1 (202), the artifacts that are to be exposed (e.g., to the extension developers) are determined (e.g., by the software provider). In some examples, the artifacts can include source code, architectural models, and user interface models. It can be further determined to expose the internal application artifacts (e.g., by the software provider) without hiding any portions of the application. In some examples, a portion of the aspects of the base software artifacts can be exposed by defining views on these artifacts. During phase 2 (204), the base software artifact for extension is selected (e.g., by the extension developer). For example, the extension developer can access, inspect and select an artifact of the software application as a base artifact (e.g., artifact 106) for extension. In some examples, previously existing extensions can be applied to create an extended base artifact. During phase 3 (206), the modifications to the artifact are defined (e.g., by the extension developer) by adapting and/or modifying the extensibility artifact. In some examples, these artifacts are owned by the base software providers and are generally provided as read-only artifacts to extension developers. Although provided as read-only artifacts, the extension developer can be provided the impression of directly modifying the artifacts, referred to as "in-place extension definition." The extension is extracted and stored automatically in a separate module, leaving the original artifact unmodified. During phase 4 (208), the extensions defined using the "in-place extension technique" of phase 3 are automatically extracted into first-class extension modules. In some implementations, the extensions can be later re-applied to the respective base software artifact to restore the extended artifact, or the extensions can be re-used in a new context.

With particular reference to phase 1 (202), the extensibility view on the artifact is defined (210). For example, the base software provider defines the base artifact for exposure. The base software provider may further select an unmodified internal application or restrict the extensibility by defining an extensibility view (e.g., hiding parts of the original artifact). The base artifact is exposed (212). In some examples, the base software provider exposes a base artifact (e.g., artifact 106), which can be accessed by the extension developer.

With particular reference to phase 2 (204), a base artifact is selected and loaded (214). The base artifact includes an artifact that has been exposed for extension by the software provider (e.g., in phase 1(202)). In some examples, an artifact of the base software is selected (e.g., by an extension developer) from a list of artifacts. The selected artifact is loaded as the base artifact for the extension. In some examples, the base artifact is loaded with a previously existing extension applied to the base artifact. In some examples, the base artifact is loaded with the in-place definition of a new extension.

The extension is selected and loaded (216). In some examples, an extension is selected (e.g., by the extension developer) from a list of available extensions. The extension is loaded such that the extension is to be applied to the currently selected target artifact. In some examples, the list of available extensions includes extensions that have been previously applied to the target artifact (e.g., extensions that contain modifications for the elements of the target artifact). In some examples, the list of available extensions includes extensions that are not yet applied to the target artifact. For example, by re-using extensions (e.g., re-using a previously defined extension fragment in another target artifact), duplicate work is avoided (e.g., by the extension developer) in the initial development phase. Additionally, the extension can be consistently adapted (e.g., by the extension developer). However, enabling the re-use of extensions may include providing additional requirements (e.g., functionality to insert existing extension fragments).

The extended artifact is composed (218). In some examples, when the extension includes modifications for the selected target artifact, the modifications are (automatically) applied to the elements (e.g., element 108) referenced as extension points. In some implementations, the composition of the target artifact and the extension is implemented by direction modification. In some examples, direct modification includes changing a copy of the target artifact directly. For example, deletions result in the removal of the referenced extension point element (e.g., element 108), and bindings (e.g., bindings object 118) result in the insertion of the referenced extension fragment. Additionally, to extract and save the extension, a comparison of the extended artifact and the original target artifact is implemented.

In some implementations, the composition of the target artifact and the extensions is implemented by annotated modification. In some examples, annotated modification includes applying an extension using annotations (e.g., provided the base computer programming language supports an annotation concept). In some examples, the annotations include the extension the modification belongs to, the modification type, and the extension fragment that the element belongs to. In some examples, when an editor tool (e.g., an editor tool employed by an extension developer to develop the extension) supports the adaptation of the element visualization, the annotation information can be used to unobtrusively emphasize the modified elements. In this manner, the elements of the target artifact and the extended elements (e.g., as viewed by the extension developer) can be distinguished.

In some examples, and with regard to deletions, the extension point elements (e.g., element 108) are annotated with the extension's identification (ID) and the modification type "deleted." Deleted elements can be visualized by the editor tool, for example, by removing the deleted elements or showing the deleted elements greyed out. In some examples, and with regard to bindings (e.g., binding objects 118), the additional elements are added to the artifact according to the binding information and marked with the extension's ID and the modification operation "added." The additional elements can be visualized by the editor tool, for example, by adapting the element's background color. Based on the annotated extension IDs, multiple extensions can be visualized by the editor tool (e.g., using different color codes). Additionally, the extension IDs can be used to extract the modifications from the extension. Newly introduced elements may additionally be annotated with the extension fragment's ID to facilitate the re-use of the fragments in multiple positions within the current artifact or in multiple artifacts, including the consistent modification of the extension.

A new element is created, edited, or deleted (220). In some examples, a new element is inserted, edited and deleted (e.g., by the extension developer) similar to directly modifying the target artifact (e.g., as if the extension developer were directly modifying the target artifact). In some examples, the in-place extension can be realized using direct modification or annotated modification, as described above. With respect to direct modification and annotated modification, the modifications are applied to a copy of the target artifact directly, or annotations are used to log the modifications. With respect to annotated modifications, additional support may be provided, for example, to visually indicate the newly introduced elements.

The position of the new element is defined (222). In some implementations, the position of the new element is defined simultaneously with the creation of the new element (e.g. when inserting a statement into a sequence of statements of a programming language). In some implementations, the position of the new element is defined in an explicit second step, for example, when applying a connecting edge between an existing vertex and a new vertex in the diagram of a graph-based modeling language.

Existing elements of the target artifact can be deleted (224). In some examples, the existing elements can be deleted (e.g., by the extension developer) using direct modification or annotated modification, as described above. In some examples, the element is directly deleted. In some examples, the annotations are used to log the modification, and further, the deletion can be visualized (e.g., by removing the element or showing the element greyed out).

The modifications are saved (226). In some examples, the extensions are saved (e.g., by the extension developer), triggering the (automatic) extraction of the extension. In some examples, saving the modifications can be implemented intuitively by overwriting the standard method of saving the artifact.

The extension is extracted as a first-class entity (228). In some examples, when an extended artifact is saved, the active extension is (automatically) extracted and the target artifact is left unmodified. In some implementations, extracting the extension results in the creation of a new extension. In some implementations, extracting the extension results in an update to an existing extension. In some examples, when direct modification of the artifact is employed, the original artifact is compared to the extended version of the artifact to identify a difference (delta) between the original artifact and the extended artifact. In some examples, when an annotated modification of the artifact is employed, the annotations can be used to retrieve the list of modified elements. In some examples, additional elements are grouped to extension fragments if they are directly associated. In some examples, the position of each fragment is stored using a binding (or multiple bindings grouped in a binding set, in case of a non-sequential positioning).

The extension is stored (230). In some examples, the newly created or updated extension is (automatically) stored as a first-class entity.

Figure 3:
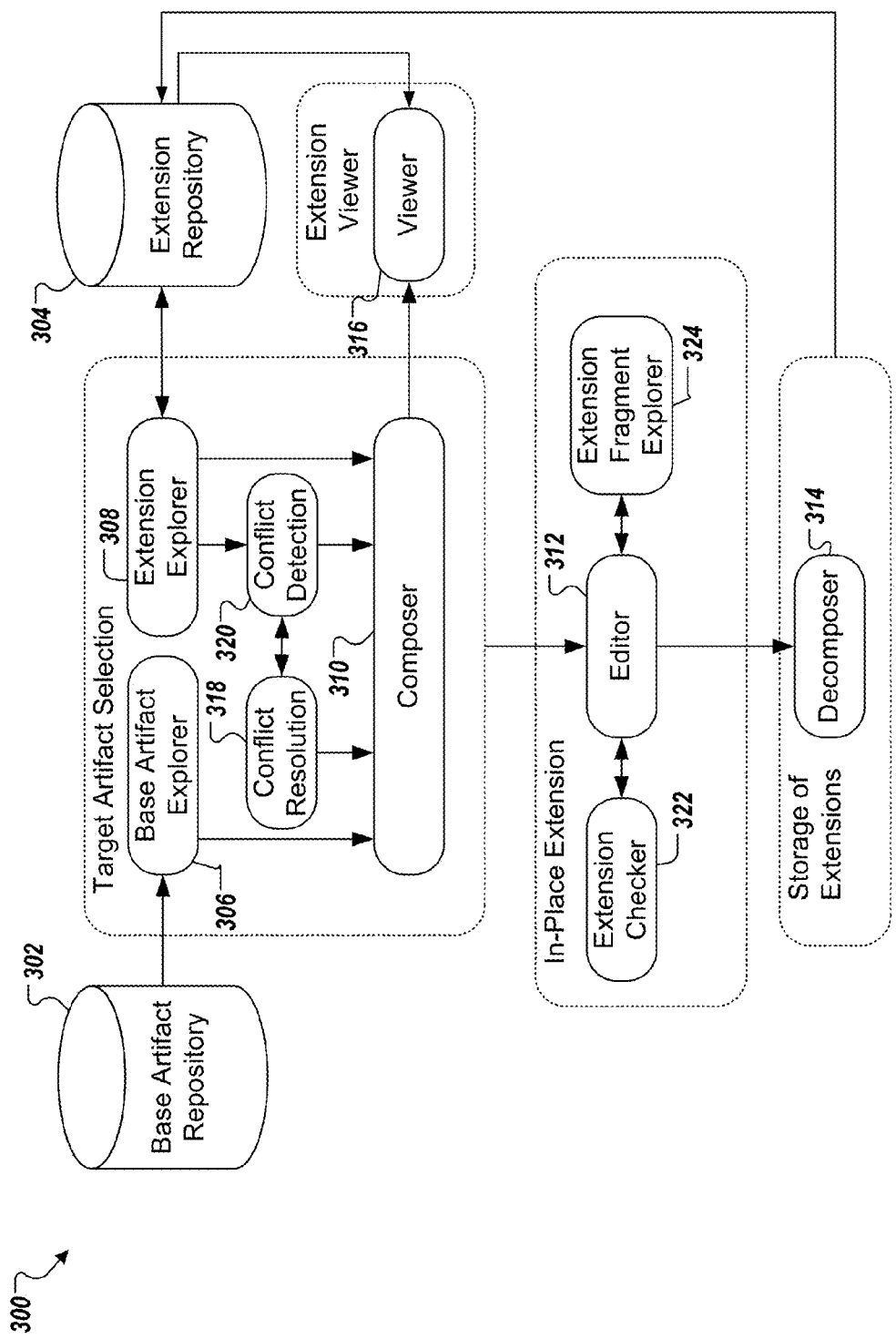
FIG. 3 depicts an example architecture for in-place extension development.

FIG. 3 depicts an example architecture 300 for in-place extension development. In the depicted example, the architecture 300 includes a base artifact repository 302, an extension repository 304, a base artifact explorer 306, an extension explorer 308, a composer 310, an editor 312, a decomposer 314, and a viewer 316. In some implementations, the system 300 further includes a conflict resolution component 318, a conflict detection component 320, an extension checker 322, and an extension fragment explorer 324. In some examples, components of the architecture 300 can be provided as one or more computer-executable programs that are executed by one or more computing devices. In some examples, components of the architecture 300 can be provided in computer-readable memory.

In some examples, the base artifact repository 302 stores the base artifacts of one or more software applications. In some examples, each artifact, extension, model, and model element is associated with a universal unique identifier for reference and traceability. With reference to the example process 200 of FIG. 2, the base artifact repository 302 is associated with at least selecting and loading of the base artifact (214).

In some examples, the extension repository 304 stores created extensions (e.g., created by the extension developer). Additionally, the repository 304 can store extensions that can be modified (e.g., by the extension developer). In some examples, the extension repository 304 stores the extensions separately from the base artifacts. In some examples, the extension repository 304 stores the extensions and the base artifacts utilizing the same repository with appropriate access rights appropriately set. In some examples, the extension repository 304 stores the extensions and the base artifacts separately in view of separate ownership of the extensions (e.g., by the extension developer) and the base artifact (e.g., the software provider). In some examples, the extension repository 304, in coordination with user management, can store extensions associated with multiple extension developers. With reference to the example process 200 of FIG. 2, the extension repository 204 is associated with at least selecting and loading of the base artifact (214) and extraction of the extension as a first-class entity (230).

In some examples, the base artifact explorer 306 receives a list of available base artifacts from the base artifact repository 302, and provides a selected artifact as an initial target artifact to the composer 310. In some examples, in response to a selection of one of the base artifacts (e.g., by the extension developer), the base artifact explorer 306 retrieves (or receives) the selected base artifact from the base artifact repository 304 and provides the selected base artifact as an input to the composer 310. In some examples, the base artifact explorer 306 can be provided as a clickable list view or as part of a comprehensive target artifact selection wizard. With reference to the example process 200 of FIG. 2, the base artifact explorer 306 is associated with at least selecting and loading of the base artifact (214).

In some examples, the extension explorer 308 provides a list of available extensions and functionality to manage the list of available extensions. In some examples, the extension explorer 308 receives a list of extensions from the extension repository 304, and provides one or more appropriate extensions and associated edit indication flags to the composer 310. In some examples, the list of available extensions is filtered to include previously defined extensions for the selected target artifact or the base artifact. In some examples, the list of available extensions is filtered to include extensions that are not in conflict with another extension of the currently selected target artifact (e.g., an extension that deletes a certain extension point is in conflict with other extensions that modify the same extension point).

In some implementations, an extension can be applied, edited, deleted, or a new extension can be created (e.g., by the extension developer) based on the list of available extensions. In some examples, the selected extension can be applied to the currently selected target artifact using the composer 310. In some examples, the extension is not editable, and thus, the edit flag indicating whether the extension is active is set to false. In some examples, the selected extension is edited (e.g., by the extension developer). In some examples, the selected extension can be edited provided that the selected extension is indicated as editable (and/or the extension developer has the rights to modify the selected extension). In some examples, when the context object 114 is supported, contexts can be created or edited (e.g., by the extension developer).

In some examples, the edit flag of the extension is set to active, and the extension is provided to the composer 310. In some examples, the selected extension is deleted (e.g., by the extension developer) from the extension repository 304. In some examples, the selected extension can be deleted provided that the selected extension is indicated as being able to be deleted (and/or the extension developer has the rights to delete the selected extension), or that the context object 114 is supported. In some examples, when deleting the selected extension, the composer 310 is not triggered. In some embodiments, a new extension is created (e.g., by the extension developer). The created extension can be provided to the composer 310, and marked as an active extension.

In some examples, the extension explorer 308 can be provided as a clickable list view (with one context menu entry per option) or as part of a comprehensive target artifact selection wizard. With reference to the example process 200 of FIG. 2, the extension explorer is associated with selecting and loading of the base artifact (214).

In some examples, in response to an action by the extension explorer 308, the composer 310 manipulates the target artifact according to the modifications defined in the selected extension. In some examples, the composer 310 receives the target artifact from the base artifact explorer 306 and the selected extension (and associated edit flag) from the extension explorer 308, and provides a modified target artifact and extension as output to the editor 312.

In some examples, the composer 310 can provide the composition of the target artifact and the selected extension using the direct modification or annotated modification, as described above. In some examples, the conflict detection component 320 determines whether the target artifact and the selected extension are compatible. In some examples, the conflict resolution component 318 visualizes the conflict and provides help to resolve the conflict, for example, by highlighting the extension point with the modification conflict and providing means to adapt the selected extension accordingly. Additionally, when the edit flag is set, the composer 310 triggers the editor 312 to display the target artifact and allow the selected extension to be edited (e.g., by the extension developer). With reference to the example process 200 of FIG. 2, the base composer 310 is associated with composing the extended artifact (218).

In some examples, the editor 312 displays (e.g., to an extension developer) the target artifact and provides functionality to modify the target artifact (e.g., by the extension developer). In some examples, the editor 312 receives the target artifact and the extension from the composer 310, and provides the modified target artifact and the extension as output to the decomposer 314. In some examples, the modified elements of the target artifact are adapted directly or annotated, as described above (e.g., utilizing the ID of the selected extension) based on whether direct modification or annotated modification is supported. When annotated modification is implemented, the different sources of the target artifact elements can be visualized (e.g. using a color code). In some implementations, the editor 312 supports modification restrictions, on the meta-level and the instance-level. In some examples, the extension checker 322 determines which modification functionality should be provided by the editor 312. In some examples, the extension fragment explorer 324 inserts existing fragments into the target artifact shown by the editor 312. When the modifications have been defined (e.g., by the extension developer), the editor 312 stores the extension, triggering the decomposer 314. With reference to the example process 200 of FIG. 2, the editor 312 is associated with deleted existing elements of the target artifact (226), creating, editing, deleting the new element (222), defining the position of the new element (224), and storing the extension (232).

In some examples, the decomposer 314 extracts extensions as first class entities. In some examples, the decomposer 314 receives the target artifact and extension from the editor 312 and provides the modified extension as output to the extension repository 304. In some examples, the decomposer 314 is triggered by the editor 312. In some examples, the decomposer 314 (automatically) identifies the modifications by comparing the adapted target artifact with the original target artifact (direct modification) or by evaluating the element annotations (annotated modification). The decomposer 314 provides the extension to the extension repository 304 for storage. With reference to the example process 200 of FIG. 2, the decomposer 314 is associated with extracting the extensions as a first-class entity (230).

In some examples, the viewer 316 displays the target artifact (e.g., to the extension developer). In some examples, the viewer 316 receives the target artifact from the composer 310 and the list of extensions from the extension repository 304. The viewer 316 provides support through the lifecycle of the extension, for example, provide for display characteristics of an extension (e.g., to a customer). In some examples, the viewer 316 displays available extensions at the respective extension points (e.g., by adding a circle with a plus sign next to the extension point). In some examples, the viewer 316 enables selection of a certain extension, and triggers the composer 310 to apply the selected extension to the target artifact (e.g., via a context menu of the circle with the plus sign). In some examples, when multiple extensions are applied to a base artifact, the viewer 316 can visualize conflicts between the extensions (e.g., by coloring the problematic elements).

Implementations of the present disclosure are discussed in further detail below with reference to an example context. The example context includes an example business process that is extended at a process level. It is appreciated that implementations of the present disclosure are applicable in other appropriate contexts. For example, a process can be extended at a code level and/or at an interface level.

Figure 4:
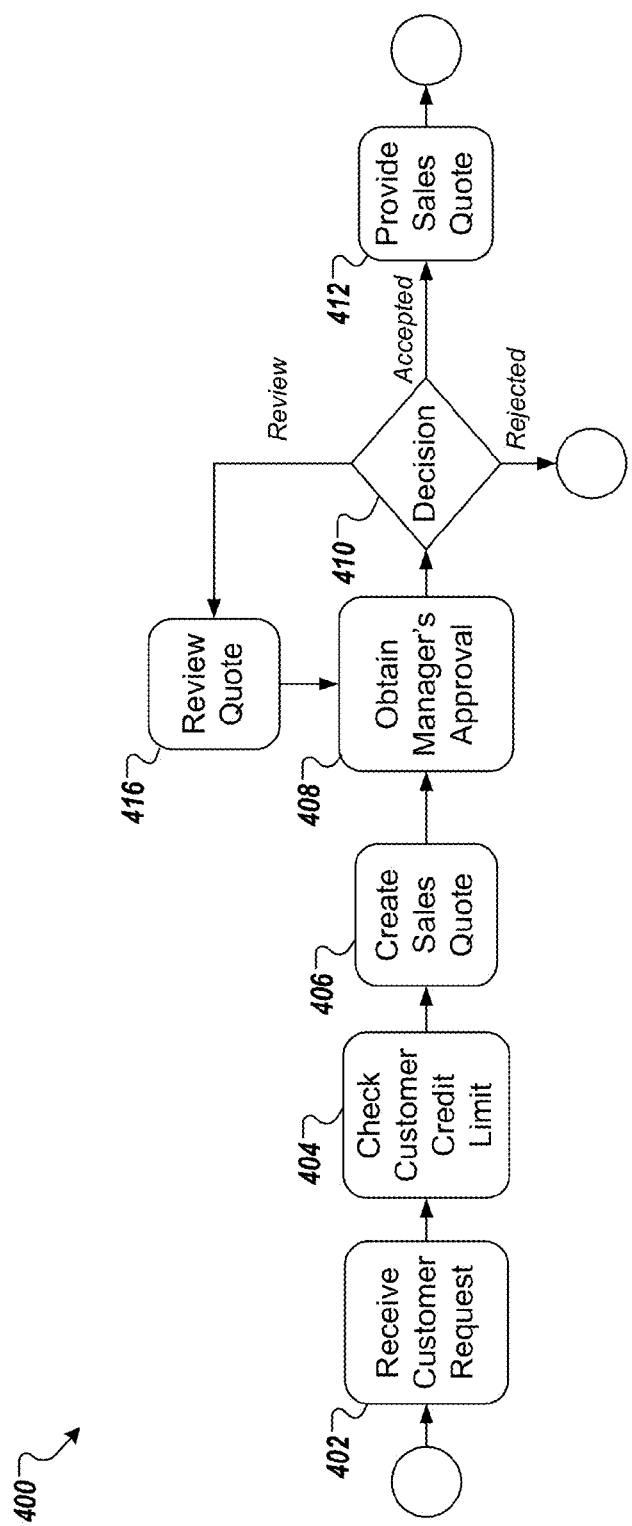
FIGS. 4 and 5 depict an example use-case in accordance with implementations of the present disclosure.

FIG. 4 illustrates an example business process 400 that is graphically depicted (e.g., within a window of a computer-executable editor executed on a computing device). In the depicted example, the business process 400 is an example sales quotation creation process. For example, the business process 400 can be utilized in such business applications as enterprise resource planning (ERP) and customer relationship management (CRM) to support standard business process (e.g., Order-to-Cash, Procure-to-Pay and Sell-from-Stock). In some examples, the business process 400 is provided in a business process modeling notation (BPMN). In some examples, the business process 400 can be provided in an electronic document that is computer-readable and can be stored in digital memory. In some examples, and as discussed in further detail herein, extension of the business process 400 is supported by the example process 200 of FIG. 2 and the example system 300 of FIG. 3.

In the depicted example, the business process 400 can be graphically displayed to a user (e.g., an extension developer) using an editor. The example business process 400 includes a plurality of tasks. A task 402 includes receiving a customer request. For example, a request for a sales quote is received from a customer. A task 404 includes checking a customer credit limit. A task 406 includes creation of a sales quote. For example, a sales employee creates the sales quote. A task 408 includes obtaining a manager's approval of the sales quote. For example, the sales employee provides the sales quote to a respective manager for approval. A task 410 includes determining whether the sales quote is accepted. For example, the respective manager can determine whether the sales quote provided by the sales employee is accepted. If it is determined that the sales quote is accepted, a task 412 includes providing the sales quote the customer. If it is determined that the sales quote is not accepted, a task 416 includes reviewing the sales quote. For example, the sales employee reviews and revises the sales quote and re-submits the (revised) sales quote to the respective manager for approval. If it is determined that the sales quote does not need further review, the sales quote is rejected.

In some implementations, the functionality (tasks) provided in the business process 400 can be included in a software application. That is, for example, the business process 400 can be embodied as a computer-executable application. In some examples, one or more extensions can be applied to the business process 400. In some examples, extensions can be applied to add, delete and/or modify tasks of the business process 400. For example, a business (e.g., an online store utilizing the business process 400) would like to extend the business process 400 to integrate customer rating data (e.g., a credit report) provided by an external credit report agency. Integration of customer rating date within the business process 400, and particularly, with creating the sales quote, minimizes risk of non-payment from customers (e.g., new customers), which is advantageous to an online store utilizing the business process 400.

Consequently, for example, payment terms and payment methods can be provided based on the credit report.

Figure 5:
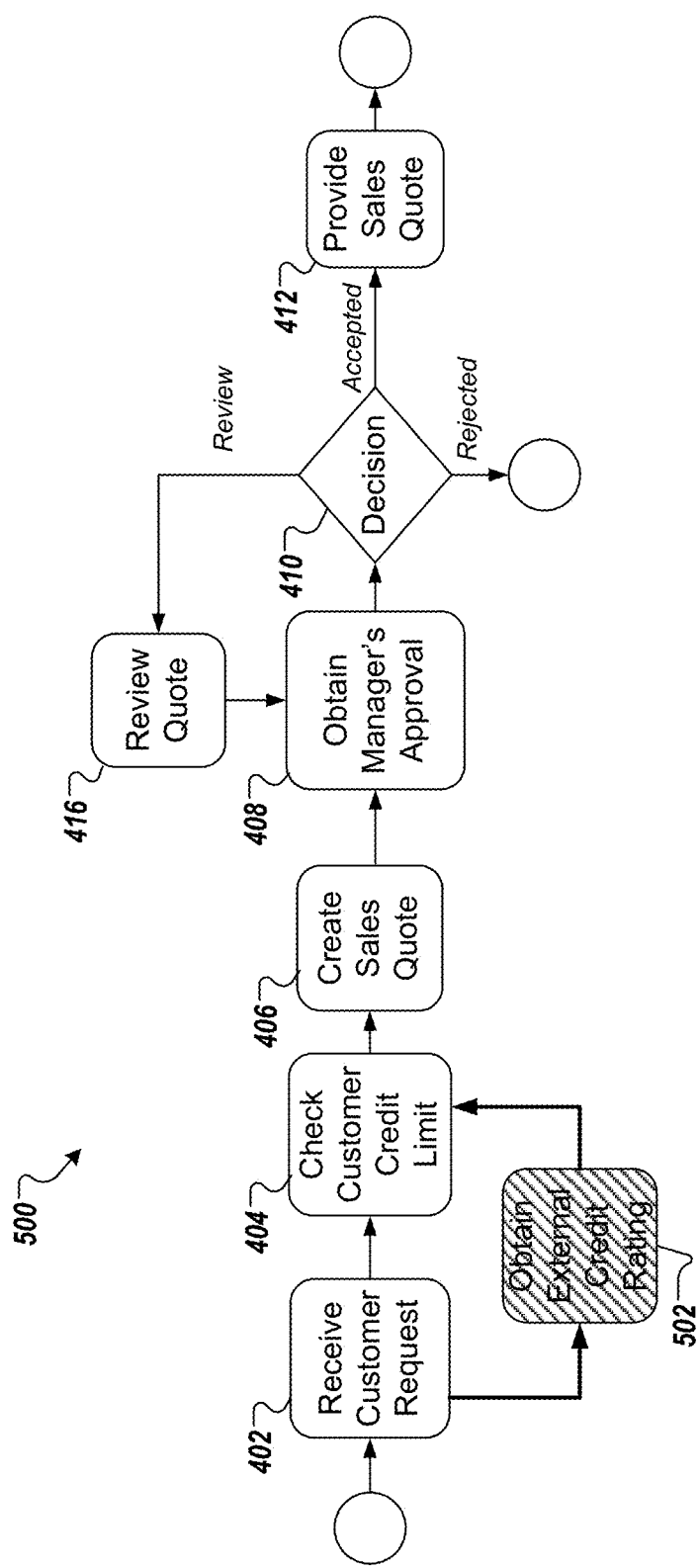

FIG. 5 illustrates an extended business process 500. In some examples, the extended business process 500 is provided in a business process modeling notation (BPMN). In some examples, the extended business process 500 can be provided in an electronic document that is computer-readable and can be stored in digital memory. In the depicted example, the business process 500 can be graphically displayed to a user (e.g., an extension developer) using an editor.

In the depicted example, the extended business process 500 is based on the business process 400 of FIG. 4 and includes a customer credit rating extension. Specifically, the business process 500 includes a task 502, during which an external customer credit rating is obtained. For example, the business obtains a credit report of the customer from an external credit reporting agency. Accordingly, the task 502 is an extension to the business process 400 to provide the extended business process 500.

To realize the example extension to the business process 400 using techniques previous to the present disclosure, extenders would have to implement the extension (e.g., the task 502) and integrate the extension with the base application. This is generally done at the code layer and would lead to a technical realization of a new task (e.g., customer credit rating retrieval). In this example, the sales representative retrieves and evaluates the credit report of the customer before sending the sales quote to his manager for approval. In code level approaches previous to implementations of the present disclosure, the extender would have to implement the customer credit rating task directly in code. That is, all work is performed at the code level. Consequently, only a sufficiently experienced (expert) technical user can perform the extension. Further, with code level approaches previous to implementations of the present disclosure, it is difficult to understand the business process that results after several extensions have been applied to the base software, because the extensions do not have corresponding models. Consequently, business users and technical users would have trouble understanding which extensions perform which activities at which points in the business process and also identifying potential conflicts when different extensions apply to the business process at the same point.

Further, it is insufficient to just include an activity for customer credit rating retrieval in the business process 400 of FIG. 4. For example, multiple extenders (e.g., independent software vendors) can provide extensions to base business software. If everyone would directly modify the base business process model, several business process models would exist, which are not composable.

In accordance with implementations of the present disclosure, and based on the example context of a business process, each extender can define a respective process extension model (a delta) that refers to the base business process. In this manner, the extension model is owned by the extender, while the base process is owned by the provider of the base business software. Examples are discussed in further detail below.

Figure 6:
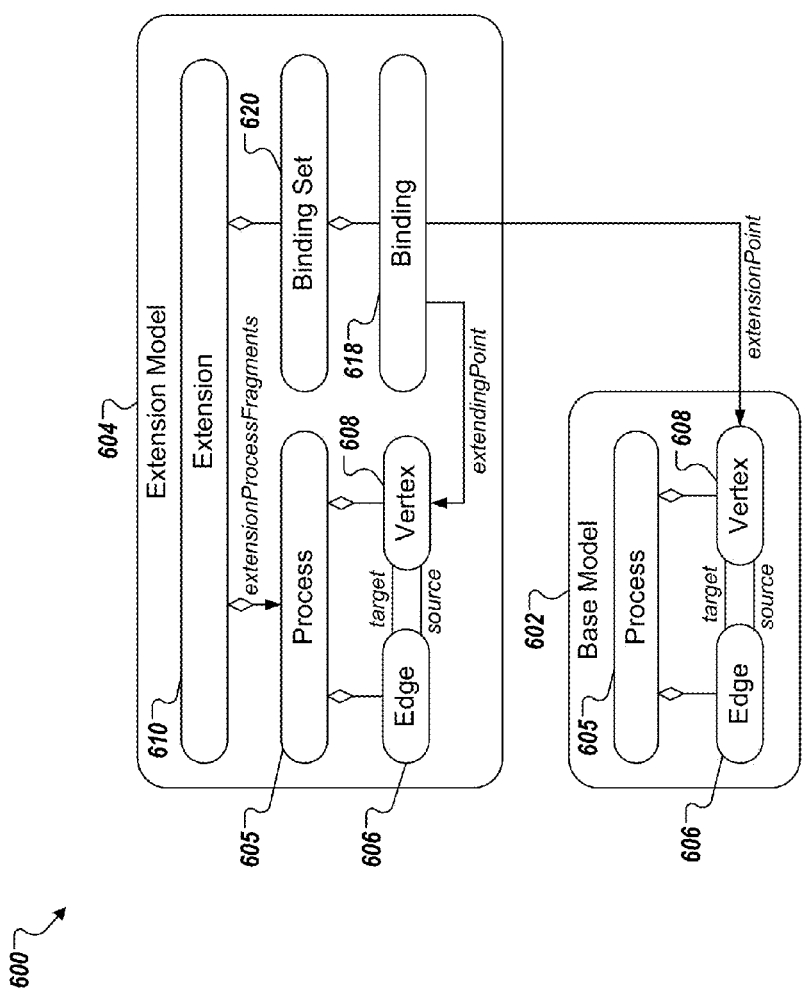
FIG. 6 depicts an example extension meta-model in accordance with implementations of the present disclosure.

FIG. 6 depicts an example extension meta-model 600. The extension meta-model 600 is provided as a business process extension meta-model 600 in accordance with the example context. The extension meta-model 600 is based on the meta-model 100 of FIG. 1. The meta-model 600 models modular and reusable extensions (e.g., process extensions) as first class entities. The process extensions may be applied to different processes as their bindings may refer to elements of different base processes. The meta-model 600 includes a base package 602 and an extension package 604 (e.g., respectively corresponding to the base package 102 and the extension package 104 of FIG. 1).

In the depicted example, the base package 602 is provided as a process model package and includes a process model of a process (e.g., the business process 400 of FIG. 4). In some examples, the process model is provided in a process definition language (e.g., BPMN) used to define the base and target process model as well as the extension process fragments. The process model 602 replaces the base package 102 of the meta-model 100 of FIG. 1. The process model package 602 includes process 605, one or more edges 606 and one or more vertices 608. In some implementations, only a portion of the elements contained in the process (i.e., the artifact) can be selected as extension points. For example, as a restriction on the meta-level, only modifications targeting vertices are allowed. Referring again to FIG. 4, the process 605 can correspond to the business process 400, where the tasks of the business process 400 are provided as vertices 608 and edges between the tasks are provides as edges 606.

The extension package 604 includes the concepts that are included in an extension. The extension package 604 corresponds to the extension package 104 of the meta-model 100 of FIG. 1. In some the example of FIG. 6, a restriction is provided at the meta-level, such that only additive modifications are allowed during extension. For example, new elements (e.g., tasks) can be added but existing elements cannot be deleted. Consequently, a deletion object (similar to the deletion object 122) is not included in the meta-model 600.

Analogous to the extension package 104, the extension package 604 includes an extension 610, one or more binding objects 618 and one or more binding set objects 620. Additionally, the extension package 604 includes the process 605, the one or more edges 606 and the one or more vertices 608 from the base package 602 (e.g., the extension package 604 provides an extension of the process 605 of the base package 602).

The development process for the in-place definition of the business process extension meta-model 600 is based on the example process 200 of FIG. 2. Specifically, in the first phase, the artifacts that are to be provided (e.g., to the extension developers) are determined (e.g., by the software provider). Additionally, it is determined (e.g., by the software provider) what views of the artifacts are to be provided (e.g., to the extension developer). In the second phase, the target business process is selected (e.g., by the extension developer), and additionally, it is determined whether a new extension is to be created and/or an existing extension is edited (e.g., by the extension developer). With respect to the present example, the annotated modification technique is employed. For example, the composition of the target model and the extension results in the insertion of extension fragments with annotations indicating the extension ID and extension fragment ID.

During the in-place extension phase (e.g., third phase), the extension is modeled as if the target business process was being directly modified (e.g., by the extension developer). For example, new vertices (e.g., the task 502 of FIG. 5) can be added and bindings are specified using the normal edge concept of the base language. As mentioned above, the business process model 500 includes a single additional fragment (e.g., the task "Get external customer credit rating" 502). In this example, the additional customer credit rating task is integrated into the business process model 500 as an optional task after the "Receive customer request" task 402.

In this manner, there is a forking binding between these two vertices and a merging binding targeting the successor task "Receive customer request" 402 of FIG. 4. The editor (e.g., the editor 312) ensures that the newly introduced elements are annotated accordingly. Based on the annotation, the visualization can be adapted. For example, the new vertex (the added task) is marked with a background color and the binding edges are visualized using a different line weight than base edges. For example, and referring to FIG. 5, the task 502 can be marked with a background color that is different than background colors of other tasks, and the edges leading to/from the task 502 can have a different line weight than edges leading to/from other tasks.

In the final (fourth) phase, the specified modifications are stored. For example, the modifications are automatically extracted by evaluating the element annotations. From the depicted example, the resulting extension includes a single process fragment and a binding set with two bindings. Each binding includes a direct reference to the extending vertex and a name-based reference to the extension point.

Continuing with the example of FIG. 5, the customer credit rating extension (e.g., the addition of the task 502) is stored in the extension repository (e.g., the extension repository 304). The customer rating extensions can be re-applied to the Sales Quotation Creation process (e.g., business process model 500) to restore the extended business process model 500 of FIG. 5. In some examples, the extension may be re-used to adapt other base processes (resulting in an additional binding set). For example, the extension may be re-used in the context of payment term and method selection, price calculation, and targeted marketing campaign management. Moreover, the Sales Quotation Creation process (e.g., the business process model 500) can be extended by additional extensions which can be used in combination with the customer credit rating extension.

In some implementations, a system for modeling the business process extensions managing the models as first-class artifacts can be based on the architecture 300 of FIG. 3. In some examples, the system can include a business process explorer, a business process extension wizard, a business process editor, and a business process decomposer.

In some examples, the business process explorer can be provided an instantiation of the base artifact explorer 306 and can provide, for example, a list view of business processes that can be extended. For example, the business process 400 of FIG. 4) can be stored in a business process repository and can be listed in the business process explorer. A base business process can be selected (e.g., by the extension developer (extender)) using the business process explorer. For example, an extender can select the business process 400.

In some examples, the business process extension wizard is provided as an instantiation of the extension explorer 308. In some examples, an existing extension is selected or a new extension is initialized and is applied to the selected (target) business process. In some examples, the business process extension wizard is triggered from a context menu (e.g., by the extension developer) and/or triggered from the business process editor.

In some examples, the business process editor is an instantiation of the editor 312 and facilitates modifications (extensions) to the business process (e.g. by the extension developer). In some examples, and if certain types of extensions are restricted by the software provider, the business process editor can enforce such restrictions. For example, the business process editor can prevent restricted adaptation, such as the removal (deletion) of base elements (e.g., tasks). In some examples, the business process editor facilitates annotations of newly added elements (e.g., in the background). Based on these annotations, the new elements can be highlighted, for example, or otherwise indicated as additions.

In some examples, the business process decomposer is provided as an instantiation of the composer 310 of FIG. 3. In some examples, the business process composer extracts and stores the extension. In some examples, the business process decomposer extracts the new parts of the extended business process (e.g., the task 502 and edges of FIG. 5, added to the base business process 400 of FIG. 4) based on the annotations of the model elements. In some examples, the business process decomposer updates the extension accordingly and stores the extension in the extension repository (e.g., extension repository 304).

It is contemplated that other instantiations of extension development can be available. In some examples, development of code level extensions can be available. For example, phase 1 of the development process includes definition of extensibility views and base artifacts. Code level artifacts that are to be exposed (e.g., to the extension developers) are determined (e.g., by the software provider). For example, the software provider can determine and indicate within the artifacts themselves, which packages and Java classes of an application are to be exposed. Phase 2 of the development process includes target artifact selection. For example, the base software artifact for extensions is selected (e.g., by the extension developer). In some examples, a specific Java class can be selected. Phase 3 of the development process includes in-place extension development. For example, the source code of the selected Java class is modified (e.g., by the extension developer). For example, the editor (e.g., the editor 312) provides a simulation (e.g., to the extension developer) of directly modifying the code ("in-place extension definition"). Phase 4 of the development process includes extraction and storage of the extension(s). In some examples, the code-level modifications are extracted and stored automatically in a separate code entity, leaving the original source code artifact unmodified. These entities include bindings to code level entities of the base code according to the meta-model 100 of FIG. 1. In some examples, code statements provided in the extension can be added at the end of a method body or after some specific method call. In some examples, the code level extensions can be later re-applied to the base Java class, or the code level extensions can be re-used in a new context.

Accordingly, the in-place extension definition of code level extensions can be based on higher level abstractions of the code such as methods, method bodies, statements, and/or method calls. Further, in-place extension definition of code level extension provides robustness. For example, even if the base source code changed (e.g., a change in line numbers of the text file containing the base source code, as a result of a method being moved), the extension would still be appropriately applied.

Accordingly, implementations of the present disclosure provide generic methods and systems that reduce the complexity of defining software extensions and that enable definition of extensions at various layers (e.g., the code level layer, the business process layer, the user interface layer). Implementations of the present disclosure further provide in-place extension definition, which gives the extenders the impression of directly modifying the base artifacts (e.g., models or source code). However, editors are provided which extract the extension defined by the user (the delta) in a separate extension module once the user saves the extension. Further the editors can enforce extension restrictions such that only pre-defined extensions (as defined by the base software provider) can be executed.

Figure 7:
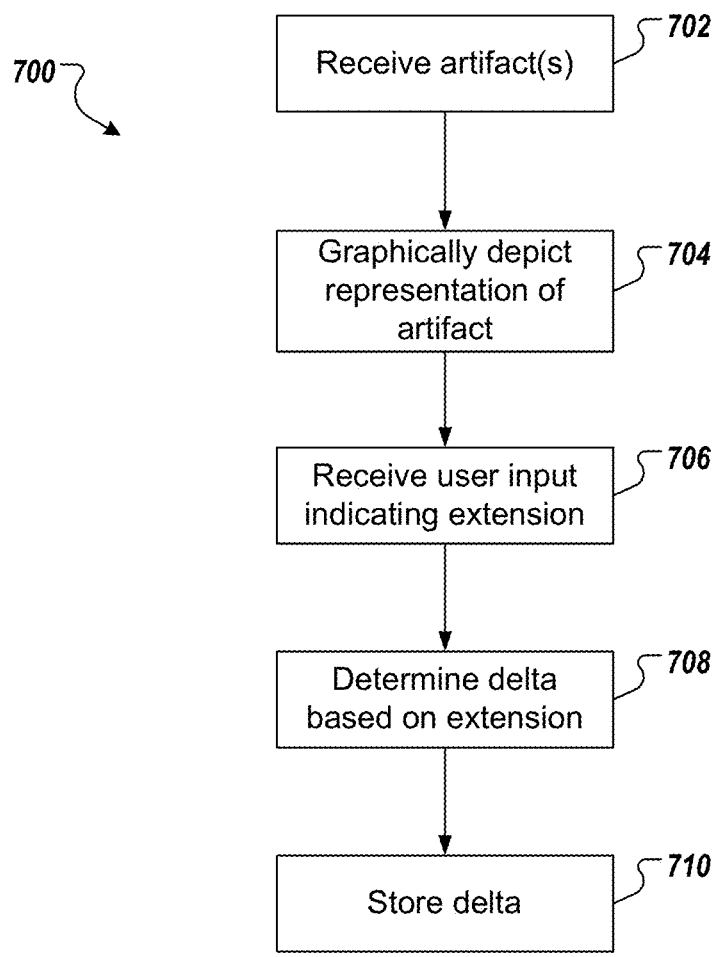
FIG. 7 depicts an example process that can be executed in accordance with implementations of the present disclosure.

FIG. 7 is a flowchart of an example process 700 for in-place extension definition for software applications. The example process 700 can be realized as one or more computer-executable programs executed using one or more computing devices. For example, the architecture 300 of FIG. 3 can be used to execute the example process 700.

One or more artifacts associated with an application are received (702). For example, the one or more artifacts can be received from a base artifact repository (e.g., the base artifact repository 302 of FIG. 3). A representation of at least one artifact of the one or more artifacts is graphically depicted on a display (704). For example, an editor can be executed by a computing device (e.g., the editor 312 of FIG. 3) and the representation can be graphically depicted within a window of the editor, the editor providing functionality to extend the artifact. In some examples, the at least one artifact comprising one or more extension points defined by a developer of the application. User input indicating an extension to the at least one artifact is received (706). For example, the user (e.g., an extension developer) can provide input to the editor. In some examples, the extension is associated with an extension point of the one or more extension points. In some examples, it can be determined whether the extension is a permitted extension. In some examples, the extension can be applied to the representation to provide an extended artifact. In some examples, the at least one artifact remains unchanged. A delta is determined based on the extension and the at least one artifact (708). In some examples, the delta is determined based on a difference between the at least one artifact and the extended artifact. The delta is stored in an extension repository (710). In this manner, the delta can be re-used to extend one or more other artifacts.

Figure 8:
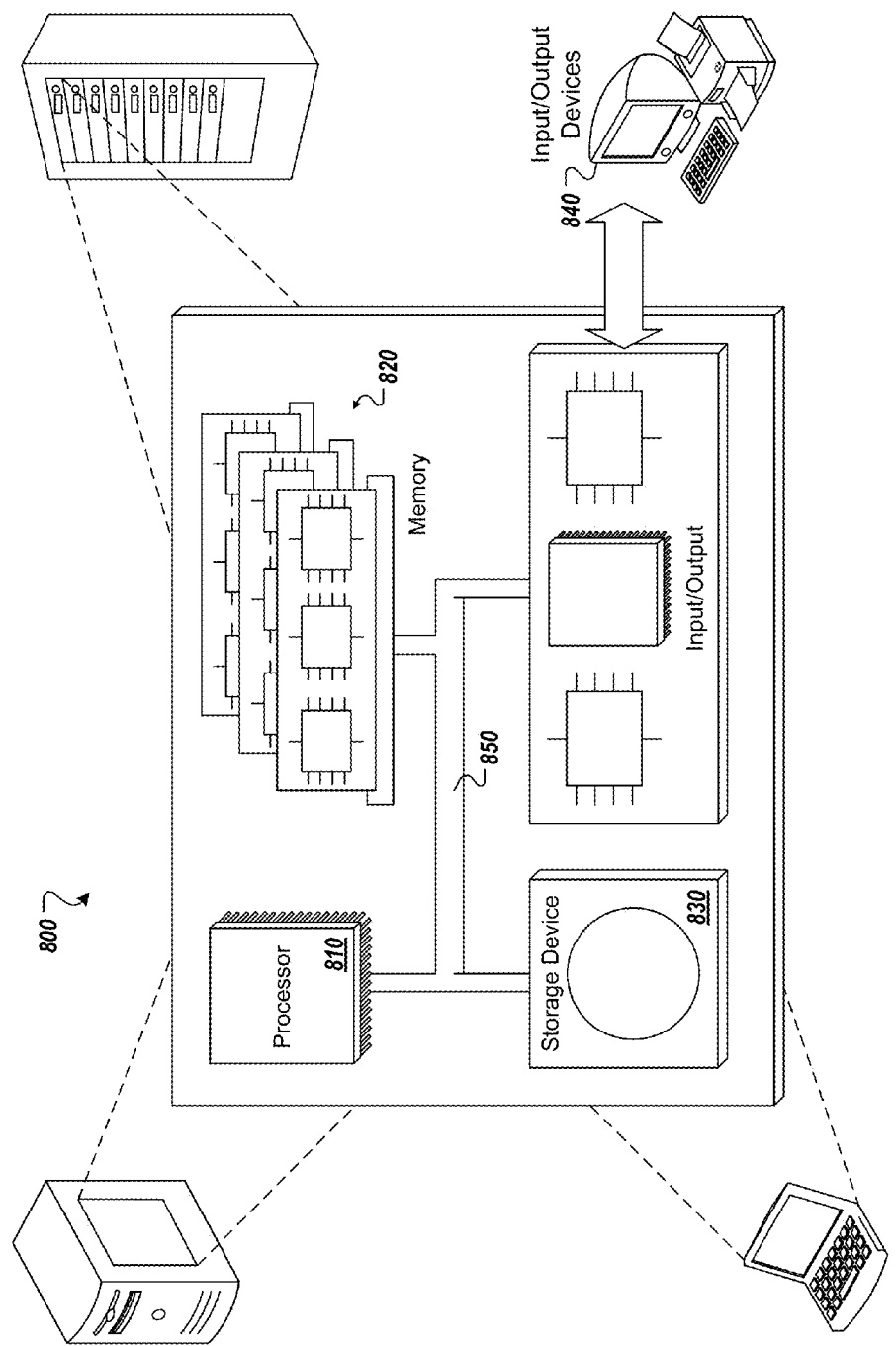
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 880 stores information within the system 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing one or more in-place extensions to an application, the method being executed by one or more processors and comprising:
    receiving, by the one or more processors, one or more artifacts associated with the application, the application comprising a computer-executable program;
    graphically depicting, by the one or more processors, a representation of at least one artifact of the one or more artifacts on a display, the at least one artifact comprising one or more extension points defined by a developer of the application;
    receiving, by the one or more processors, first user input indicating a first extension to the at least one artifact, the first extension being associated with an extension point of the one or more extension points and being applied to the representation, to provide an impression of an extended artifact to indicate to the developer that the first extension is directly changing the at least one artifact, while the at least one artifact remains unchanged in view of the first extension being applied to the representation;
    determining, by the one or more processors, a delta defined as a difference between the impression of the extended artifact and the at least one artifact, such that the delta leaves the at least one artifact unchanged in view of the first extension; and
    storing, by the one or more processors, the delta in an extension repository that is separated from a storage of the one or more artifacts, the delta being usable to extend the one or more other artifacts.

2. The method of claim 1, wherein an extended artifact is defined based on application of the first extension to the representation.

3. The method of claim 2, wherein the delta comprises an aggregation of the first extension and a second extension.

4. The method of claim 1, further comprising:
    receiving second user input indicating a second extension to the at least one artifact;
    determining that the second extension is a prohibited extension; and
    prohibiting application of the second extension.

5. The method of claim 4, wherein the prohibited extension is defined by the developer of the application.

6. The method of claim 4, wherein the prohibited extension comprises a deletion of a portion of the artifact.

7. The method of claim 1, further comprising:
    graphically displaying a list of applications on a display; and
    receiving user input indicating a selection of the application from the list of applications, wherein graphically depicting the representation of the at least one artifact on the display is performed in response to the user input.

8. The method of claim 1, further comprising:
    graphically displaying a list of available extensions on a display; and
    receiving user input indicating a selection of the first extension from the list of available extensions.

9. The method of claim 1, wherein the representation of the at least one artifact comprises a process level representation depicting one or more tasks and a workflow provided as edges between tasks of the one or more tasks.

10. The method of claim 1, wherein the first extension comprises one of a modification of a task of the one or more tasks, a deletion of a task from the one or more tasks and an addition of a task to the one or more tasks.

11. The method of claim 1, wherein the first user input comprises a graphical manipulation of the representation.

12. The method of claim 1, wherein the representation of the at least one artifact comprises a code level representation.

13. The method of claim 1, wherein the representation of the at least one artifact comprises an interface level representation.

14. The method of claim 1, further comprising, for each extension point of the one or more extension points, providing a list of available extensions, the list of available extensions being specific to a respective extension point.

15. A non-transitory computer-readable storage medium coupled to one or more processors and having instructions stored thereon which, when executed by the one or more processors, cause the one or more processors to perform operations for providing one or more in-place extensions to an application, the operations comprising:
    receiving, by the one or more processors, one or more artifacts associated with the application, the application comprising a computer-executable program;
    graphically depicting, by the one or more processors, a representation of at least one artifact of the one or more artifacts on a display, the at least one artifact comprising one or more extension points defined by a developer of the application;
    receiving, by the one or more processors, first user input indicating a first extension to the at least one artifact, the first extension being associated with an extension point of the one or more extension points and being applied to the representation, to provide an impression of an extended artifact to indicate to the developer that the first extension is directly changing the at least one artifact, while the at least one artifact remains unchanged in view of the first extension being applied to the representation;
    determining, by the one or more processors, a delta defined as a difference between the impression of the extended artifact and the at least one artifact, such that the delta leaves the at least one artifact unchanged in view of the first extension; and
    storing, by the one or more processors, the delta in an extension repository that is separated from a storage of the one or more artifacts, the delta being usable to extend the one or more other artifacts.

16. A system, comprising:
a computing device comprising one or more processors; and
a computer-readable storage device coupled to the computing device and having instructions stored thereon which, when executed by the computing device, cause the computing device to perform operations for providing one or more in-place extensions to an application, the operations comprising:
- receiving, by the one or more processors, one or more artifacts associated with the application, the application comprising a computer-executable program;
- graphically depicting, by the one or more processors, a representation of at least one artifact of the one or more artifacts on a display, the at least one artifact comprising one or more extension points defined by a developer of the application;
- receiving, by the one or more processors, first user input indicating a first extension to the at least one artifact, the first extension being associated with an extension point of the one or more extension points and being applied to the representation, to provide an impression of an extended artifact to indicate to the developer that the first extension is directly changing the at least one artifact, while the at least one artifact remains unchanged in view of the first extension being applied to the representation;
- determining, by the one or more processors, a delta defined as a difference between the impression of the extended artifact and the at least one artifact, such that the delta leaves the at least one artifact unchanged in view of the first extension; and
- storing, by the one or more processors, the delta in an extension repository that is separated from a storage of the one or more artifacts, the delta being usable to extend the one or more other artifacts.

\* \* \* \* \*